United States Patent [19]
Da Forno

[11] Patent Number: 5,953,791
[45] Date of Patent: Sep. 21, 1999

[54] EYE-GLASS EARPIECE WITH ADJUSTABLE HINGE JOINT

[75] Inventor: Alessandro Da Forno, Pieve di Cadore, Italy

[73] Assignee: Marcolin S.p.A., Longarone, Italy

[21] Appl. No.: 08/945,818

[22] PCT Filed: May 28, 1996

[86] PCT No.: PCT/EP96/02259

§ 371 Date: Nov. 5, 1997

§ 102(e) Date: Nov. 5, 1997

[87] PCT Pub. No.: WO96/37801

PCT Pub. Date: Nov. 28, 1996

[30] Foreign Application Priority Data

May 25, 1995 [IT] Italy .................................. BL95A0007

[51] Int. Cl.⁶ .............................. G02C 5/22; G02C 5/14
[52] U.S. Cl. .............................. 16/228; 16/298; 351/153; 351/113
[58] Field of Search ...................... 16/228, 298; 351/113, 351/153

[56] References Cited

U.S. PATENT DOCUMENTS

| | | | |
|---|---|---|---|
| 3,644,023 | 2/1972 | Villani | 351/113 |
| 4,534,628 | 8/1985 | Morel | 16/228 |
| 5,155,507 | 10/1992 | Ford | 351/111 |
| 5,165,060 | 11/1992 | Huang | 351/113 |

FOREIGN PATENT DOCUMENTS

| | | |
|---|---|---|
| 0096928 | 12/1983 | European Pat. Off. . |
| 0306446 | 3/1989 | European Pat. Off. . |
| 0623836 | 11/1994 | European Pat. Off. . |

*Primary Examiner*—Anthony Knight
*Assistant Examiner*—Donald M. Gurley
*Attorney, Agent, or Firm*—Evenson, McKeown, Edwards & Lenahan, PLLC

[57] ABSTRACT

An earpiece for eyeglasses is characterized by an earpiece body (1) having an eyelet (2) at its end and a threaded section (6) on which is screwed a sleeve (10) containing an elastic mechanism (9) suitable for pushing a cursor (8) against the eyelet (2) so that the distance between the sleeve edge (10a) and the cursor body (8c) can be adjusted.

5 Claims, 1 Drawing Sheet

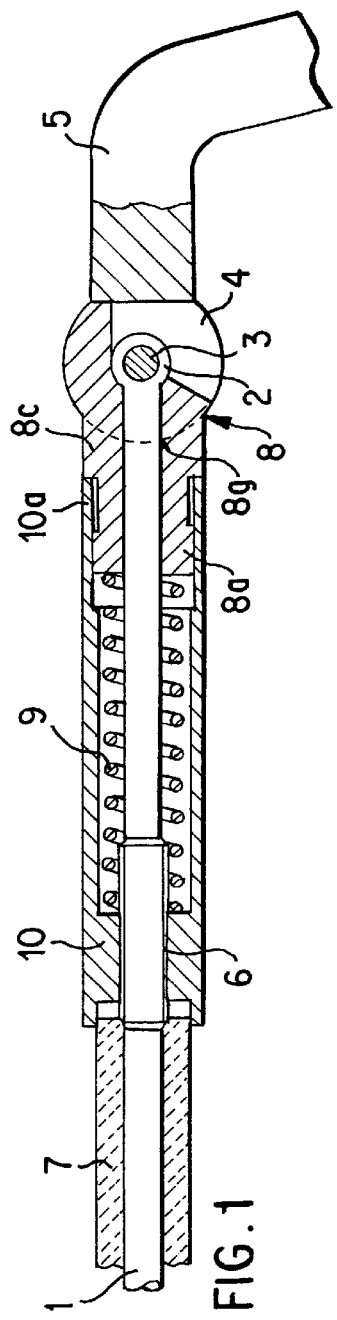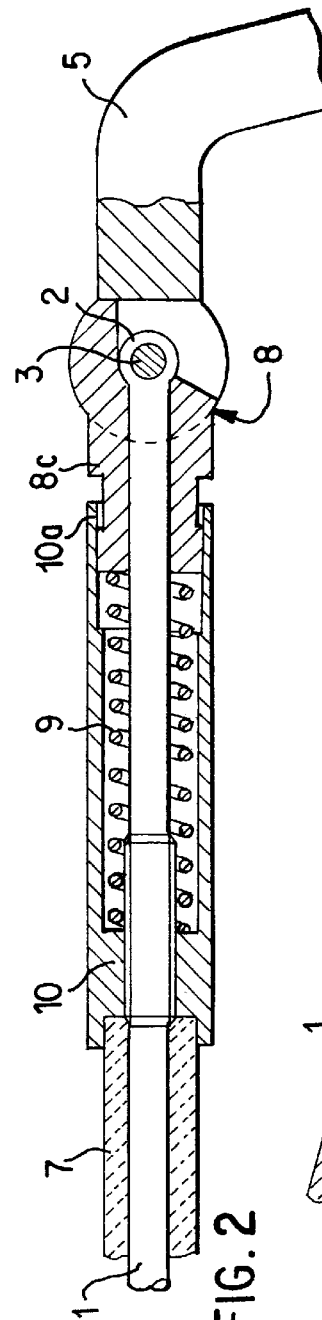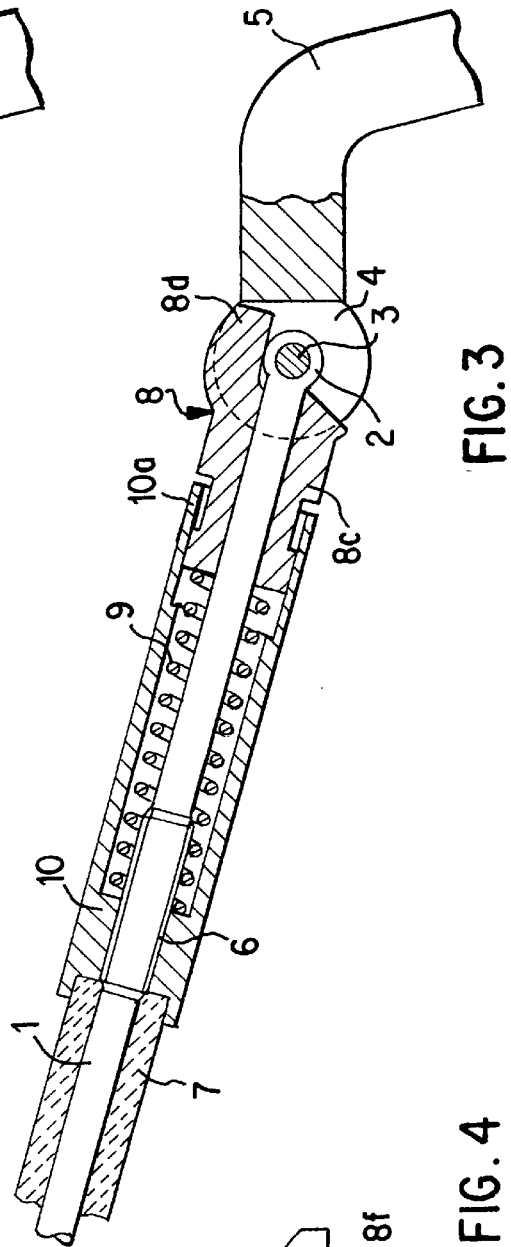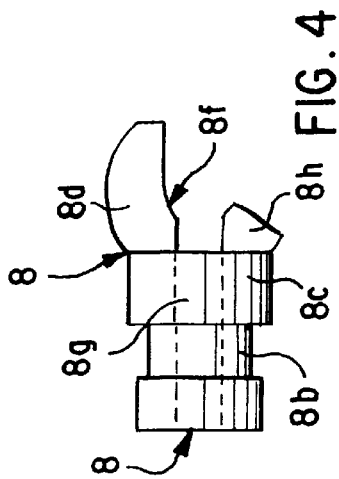

EYE-GLASS EARPIECE WITH ADJUSTABLE HINGE JOINT

This invention pertains to a new type of earpiece for eyeglass frames which makes it possible to adjust the angular opening with respect to the front piece to which it is associated; it works by effect of the compensation action of a built-in elastic mechanism compressed during flexing.

The innovative feature is substantially that of having the end of the earpiece, which already has a normal eyelet hinging to the front piece, fitted with a cursor normally pressed against the hinge-bend or hinge end of the front piece by a suitable elastic means abutting against the threaded base of a sleeve, the position of which may be translated by turning it on the screw-thread on the earpiece in order to adjust the length of the travel of the cursor when striking the hinge-bend, thus varying the flexing (flection) of the earpiece.

To improve the conditions for a stable positioning of the glasses on the nose, different elasticized hinging solutions of the earpieces on the front piece were adopted, so as to force it into a light but adequate pressure against the temples, to prevent the glasses from slipping from the nose.

Most of the present known systems are based on the use of an elasticized mechanism, generally a spiral spring, opened by compression or tension on the hinge or on the hinge-bend of the front piece. Sometimes the spiral spring is replaced by a flat spring or other flexing elastic mechanism.

Such known systems, however, are characterized by a certain structural complexity, not to mention their relative weakness, due to the small sizes which the various parts must have, to the point that many people are induced in preferring normal earpieces, which, because of their simple structure, can have larger sizes and are sturdier.

Moreover such known elastic hinge systems do not permit adjusting the width of the opening of the earpieces, thereby exerting increasing and bothersome pressure on the temples, with the increase of flexing due to the individual constitution of the person.

The prior art documents EP-A-96 928 and EP-A-306 446 disclose how to realize an earpiece for eyeglasses that has an adequate elasticized opening system, for the desired effect of eyeglass removing, but with the possibility of this opening being adjustable and variable in relation to the morphological structure of the face, to ensure the correct earpiece pressure for each opening width. These documents, however, are silent regarding the above mentioned innovative feature.

The object achieved by the present invention can be gathered from the following description of one of its constructional solutions, which is to be understood only by way of example and not limiting. With the invention an extremely simple and functional system of elasticization of the earpiece, to assure maximum solidity of its parts and, therefore, long-lasting action, is achieved.

Furthermore, the innovation can be improved such that a cylindrical or polygonal surface is created along the hinging zone of the earpiece for embellishment and decoration that could give the eyeglasses further aesthetic value.

According to the invention the opening of the earpiece is adjustable so that it can be adapted to any shape of the head without exerting excessive pressure. The degree of precharging of the elastic means can be adjusted. It is possible to define the axial flexing of the cursor and the subsequent angular opening of the earpiece relatively to the normal opening angle on the front piece of the hinge-bend.

A preferred embodiment of the invention is illustrated with the help of four schematic drawings reproduced in the enclosed table in which FIG. 1 represents a plan view, with an axial section of the hinge end of an earpiece for eyeglasses, built according to the invention and preset to act without any flexing relative to the normal opening of the front piece;

FIG. 2 represents a plan view of the same earpiece as at FIG. 1, with an analogous axial section, but preset for a possible adjustable flexing;

FIG. 3 represents a plan view of the same earpiece as at FIG. 1, with an analogous axial section, but with the maximum flexing allowed by the degree of the set adjustment;

FIG. 4 represents a perspective plan view of a detail applied to the earpiece in question.

In all the figures, the same details are represented, or are meant to be represented, with the same reference numbers.

Item 1 represents a detail of an end of the earpiece for eyeglasses, with an eyelet 2, which hinges the pin 3, which in turn is fixedly connected to hinge part 4 which constitutes part of the hinge-bend or end of the front piece of the eyeglasses 5.

The said end of the earpiece 1 has a threaded portion 6, at a suitable distance from the eyelet 2. The same earpiece end 1 can be a usual core for a plastic sheathing 7, or else can be left uncovered, at any rate having a diameter, or other constant cross-section, suitable for being slipped in to let the cursor 8 slide forward until it strikes against the eyelet 2.

The spiral spring 9 surrounds the earpiece 1 while abutting the head of the cursor 8 with its one end, as well as the sleeve 10 with its other end. Sleeve 10 is screwed onto the thread 6, whereby the spiral spring 9 supplies the elastic mechanism with a suitable compression pre-load. Referring to FIG. 4, the cursor 8 is made up of an extremity 8a with a relief groove 8b and of a cylindrical body 8c on which a disk-piece 8d is fitted with an axial joint 8f and adapting to the shape of the eyelet 2 of the earpiece 1 against which it normally strikes, being fitted onto said earpiece through its channel 8g. The cursor 8 has another reduced sector 8h, whose reduced angular extension is due to the fact that it must allow the closing rotation of the earpiece 1, as shown below.

Having completed the description of the hinge parts, a description of their function can now be given in order also to show that they are in conformity with the specified objects and purposes.

Referring to FIG. 1, supposing an earpiece without any elastic effect is needed, FIG. 1 shows an earpiece working like a normal, rigid earpiece. In this case, the sleeve 10 is screwed in in the direction towards hinge-bend 5, along the thread 6 of the earpiece 1, until the edge 10a abuts the body 8c of the cursor 8, forming a single functional element that presses the disk extremity 8d against the head of the hinge-bend 5.

The rigidity of the functional element, formed by the sleeve 10 and by the cursor 8 abutting the hinge-bend 5, prevents any flexing of earpiece 1 exceeding the normal angular opening between the earpiece 1 and the front piece of the hinge-bend 5.

If the earpiece 1 is to be closed (i.e. the eye glasses are to be folded together), it is sufficient to bring the earpiece 1 from its open position approximately orthogonal to the front piece of the hinge-bend 5 to the closed position approximately parallel to said front piece.

FIGS. 2 and 3 illustrate the situation where a particular flexing of the earpiece is desired so that normal pressure on the temples is assured in that position.

As can be seen from FIG. 2, sleeve 10 has merely to be unscrewed along the thread 6 of earpiece 1, so that a suitable space is obtained between the edge 10a of sleeve 10 and the body 8c of cursor 8.

In case of flexing, which is caused, for example, when the glasses are worn, the head 8d of the cursor, being always in contact with the abutting front piece of the hinge-bend 5, forces the cursor to travel along the earpiece 1, while slightly detaching itself from the eyelet 2. This axial translation brings about a compression of the elastic means 9, which, in this way, assures the desired pressure on the temples. This translational displacement of cursor 8 causes the sleeve edge 10a to gradually approach the cursor body 8c.

The moment of contact in the new flexed position between the edge 10a and the cursor body 8c determines the maximum flexing (flection) or angular opening allowed.

It is evident that if the flexing (flection) has been adjusted too strongly or not sufficiently, it is possible to screw in or screw out the sleeve 10 along the earpiece thread 6 so as to reach an angular opening that assures the right earpiece pressure on the temples, so that the main object of the innovation is reached.

The possibility of having an earpiece in one single piece 1, that is elastic but at the same time directly hinged to the pin 3 with its extremity 2, without the interposition of elastic joining pieces between the earpiece and the hinge as with the majority of the known present-day elastic earpieces, makes the proposed solution solid, sturdy and simple, in conformity with another object mentioned. Furthermore, the surface of the sleeve 10 may be used advantageously for the application of an embellishment and decoration, conforming to another object already indicated.

Naturally, the constructive solution illustrated is meant to be taken solely as an example and is not limiting; indeed it is possible, for example, to replace the spiral spring 9 by another elastic mechanism. Furthermore, the inversion of the fitting between the cursor parts 8a and 8b with the sleeve edge 10a is possible.

These and other analogous modifications or adaptations are at any rate considered as falling under the scope of the invention that is to be protected.

I claim:

1. Earpiece for eyeglasses comprising:

an earpiece body having a hinging eyelet at its end, a sleeve containing an adjustable elastic mechanism and having a sleeve edge, said earpiece body extending axially through the sleeve and the adjustable elastic mechanism, and a cursor which is pushed toward the hinging eyelet by the elastic mechanism and which has an axially extending opening through which the earpiece body slidably extends, wherein the earpiece body and the sleeve each have a threaded part such that they are adjustably screwable together, allowing for an adjustment of a distance between the sleeve edge and a body of the cursor.

2. Earpiece for eyeglasses according to claim 1, wherein the hinging eyelet is fitted at a pin of a hinge connected to a hinge-bend of a front piece of the eyeglasses.

3. Earpiece for eyeglasses according to claim 2, wherein the cursor is slidably mounted onto the earpiece body, said cursor having extremities kept in contact with the eyelet by the elastic mechanism, one of the extremities abutting against the hinge-bend.

4. Earpiece for eyeglasses according to claim 3, wherein the body of the cursor is designed to meet the sleeve edge to determine an axial translation of the cursor along the earpiece body, said axial translation determining a corresponding opening of the earpiece body.

5. Earpiece for eyeglasses according to claim 1, wherein the sleeve has a threaded bottom matching the threaded part of the earpiece body, said threaded bottom coming into contact with the elastic mechanism to push the cursor against the hinging eyelet, said sleeve edge designed to meet the body of the cursor in order to determine maximum translation allowed to the cursor during flexing of the earpiece body.

* * * * *